United States Patent [19]
Renard

[11] Patent Number: 5,822,376
[45] Date of Patent: Oct. 13, 1998

[54] HIGH-SPEED MULTIPLIER TO MULTIPLY A DIGITAL SIGNAL BY A PERIODIC SIGNAL

[75] Inventor: Alain Renard, Chabreuil, France

[73] Assignee: Sextant Avionique, Velizy Villacoublay, France

[21] Appl. No.: 744,830

[22] Filed: Nov. 6, 1996

[30]  Foreign Application Priority Data

Nov. 10, 1995 [FR]  France .................................. 95 13346

[51] Int. Cl.$^6$ ....................................................... H03K 9/00
[52] U.S. Cl. .......................... 375/316; 375/302; 364/721; 364/729; 327/106; 327/129
[58] Field of Search .................... 375/316, 302; 364/721, 729; 327/106, 129

[56]  References Cited

U.S. PATENT DOCUMENTS

| | | | |
|---|---|---|---|
| 4,652,832 | 3/1987 | Jasper ....................................... | 327/106 |
| 5,208,856 | 5/1993 | Leduc et al. ............................... | 380/14 |
| 5,224,161 | 6/1993 | Daniel et al. .............................. | 380/14 |
| 5,276,633 | 1/1994 | Fox et al. .................................. | 364/721 |
| 5,293,170 | 3/1994 | Lorenz et al. ............................ | 342/352 |
| 5,631,586 | 5/1997 | Sogo ....................................... | 327/106 |

FOREIGN PATENT DOCUMENTS 0 635 728 A1  1/1995  European Pat. Off. .

OTHER PUBLICATIONS

Robert Hawley, et al. "A Silicon Compiler for High–Speed CMOS Multirate Fir Digital Filters", Proceedings of the International Symposium on Circuits and Systems, San Diego, May 10–13, 1992, Institute of Electrical and Electronics Engineer, vol. 3 of 6, pp.(1348–1351), May 10, 1992.

Loke K. Tan, et al. "A 200 MHz Quadrature Digital Synthesizer/Mixer in 0.8 um CMOS", IEEE Journal of Solid-State Circuits, vol. 30, No. 3, pp. (193–200), Mar., 1995.

*Primary Examiner*—Stephen Chin
*Assistant Examiner*—Frederick Yu
*Attorney, Agent, or Firm*—Oblon, Spivak, McClelland, Maier & Neustadt, P.C.

[57]  ABSTRACT

Disclosed is a digital multiplication circuit to multiply a digital signal SN by a periodic waveform that is, in principle, a sine waveform. This circuit uses a phase digital generator φ varying in saw-toothed form and it uses an approximation of the samples of a function K sine φ by algebraic sums of positive integer values of two for each phase value, K being a coefficient identical for all the phase values. The product of SN by these sums is rapid and easy to obtain and does not require a sine table. A decoder receiving the phase φ defines the powers of two to be set up, and a routing circuit carries out the operation of multiplication by powers of two under the control of the decoder. One or two adders obtain the sums of powers of two. The result is an approximate result of the product SN.K. sine φ.

14 Claims, 5 Drawing Sheets

HIGH-SPEED MULTIPLIER TO MULTIPLY A DIGITAL SIGNAL BY A PERIODIC SIGNAL

BACKGROUND OF THE INVENTION

1. Field of the Invention

The invention relates to digital multipliers that can be used to multiply a first digital signal by digital samples of a periodic waveform, the variation of which will generally be sinusoidal.

The explanations on the present invention are given with reference to a precise application, in a positioning receiver using GPS (global positioning system) or GLONASS (global orbiting navigation satellite system) satellite signals. However it will be understood that the high-speed multiplication method proposed herein and the multiplier that implements this method are applicable to other situations in which it is sought to multiply a digital signal by digital samples of a periodic signal.

2. Description of the Prior Art

GPS or GLONASS receivers are machines that may receive radiofrequency signals from several satellites of a constellation of satellites in orbit around the earth. These receivers enable the computation, on the basis of these signals, of the exact position of each receiver and possibly its speed as well as the absolute time.

In the GPS or GLONASS systems, the radiofrequency signals consist of a carrier at fixed frequency phase-modulated by a binary pseudo-random code and by other digital data. The transmission power values of the satellites are very low and the pseudo-random code is used to improve the detection of the signal in a noise having a level far higher than that of the signal. At reception, the received signal, namely the carrier of the pseudo-random code, is correlated with an identical code locally produced in the receiver.

In the receivers designed recently, the signal processing operation used to perform this correlation is entirely digital. Hence, the signal received from the satellite is digitized after the transposition of its carrier frequency to a value that is low enough for this digitization to be possible. Then the correlation is done.

Now, in order to take account of phenomena such as, firstly, the Doppler effect and, secondly, the duration of propagation of the signal, the correlation requires a phase and frequency servo-control loop. This loop forms part of the signal digital processing circuit.

In the servo-control loop, the digitized signal may again undergo a frequency transposition in a purely digital form, i.e. the signal (represented by regular samples encoded on a few bits) is multiplied by a sine (digitized) waveform. The result of the multiplication is a digital signal with transposed carrier that still conveys the initial modulation by the pseudo-random code. It is this signal that will undergo a correlation with a pseudo-random code that is identical but generated by a local generator.

In the digital servo-control loop, a digital sinusoidal signal is generally not directly available. To obtain it, a phase numerical control oscillator is used. This oscillator gives a periodic digital phase $\phi$ varying in a linear sawtoothed form between 0 and $2\pi$ radians.

To convert his digital sawtooth into a sinusoidal signal, a sine or cosine table (generally both are needed to have phase quadrature signals) is used. A table of this kind is constituted by a read-only memory which, at each of its addresses, contains precisely the sine (or the cosine for a cosine table) of the digital value of this address. The phase $\phi$ is applied as an address on 4 bits for example, so that the memory gives sines when it receives an address $\phi$.

The sinusoidal digital signal sines is then multiplied in a standard binary multiplier with the digitized signal coming from the satellite.

This approach comes up against physical limits when the rate of computation of the results is high. Like the read-only memories, the multipliers are retarding factors. Furthermore, they are costly circuit elements for they take up much space on an integrated circuit chip if the number of bits of the digital signal is great.

SUMMARY OF THE INVENTION

In order to circumvent this limitation, the invention proposes an original method of multiplication and a novel structure of a corresponding multiplier to multiply a first digital signal by a digitized periodic waveform.

The invention is based on the observation that in applications such as those mentioned here above, the result of the multiplication may be defined to the nearest value of a coefficient K: the true aim of the multiplication is the frequency transposition or the modulation of a digital signal by a waveform. In this case, the multiplication may be done to the nearest value of a coefficient provided that this coefficient is constant, within the limit of the desired precision, during successive operations of multiplication performed.

The method according to the invention consists of the use of a digital phase $\phi$ that can vary periodically in a sawtoothed form and of the application of this phase to the input of a decoder using, as a decoding function, a table of N approximate integer values Ai of N numbers K sine $2i\pi/N$, i being an index ranging from 0 to N−1, and K being any number that is identical for all the indices i, the approximate integer values Ai being algebraic sums of one or more positive integer powers of 2 to which a sign is assigned. And the multiplication of the digital signal SN by a sine waveform then simply consists, for each index i corresponding to a phase $2i\pi/N$, in multiplying the signal SN by the various powers of 2 that form the number Ai, under the control of the decoder, and in obtaining the algebraic sums of the signals thus multiplied to form a digital value that is the product of SN by the approximate value Ai. The algebraic sums Ai imply, at least for certain values of i, a sum of several different powers of two.

The multiplication by a power of two before an addition essentially consists in making a shift, by one or more ranks towards the more higher-order values, of the digital signal with respect to the inputs of an adder which then takes the sum, and in placing zeros on the less significant values. The reversal of the sign consists in taking the one's complement and adding 1.

An explanation is given further below of the reasons and advantages of this method but it can already be said that the multiplication thus performed brings into play only a very simple decoding and routing circuit and a very small number of adders (one or two of them). This circuit can work at a high rate.

Using this method, the invention therefore proposes a digital multiplication circuit for the periodic multiplication of a digital value SN by a sine waveform, wherein said circuit comprises:

a means to produce a periodic digital phase $\phi$ varying in sawtoothed form, a decoder receiving the phase $\phi$ and bringing about the correspondence, with any value $2i\pi/N$ of the phase $\phi$, where i is an index varying from 0 to N−1, of one or more positive integer powers of 2 to which a sign is assigned, the algebraic sum of which is a number Ai, the number Ai being an approximate value of K sine $2i\pi/N$, K having the same value for all the values of Ai, routing means activated by the decoder when it receives a phase $2i\pi/N$ to give one or more signals SNij from the signal SN, the signal SNij representing the signal SN multiplied by one of the powers of two that are assigned a sign and are used in the sum Ai, means of addition activated by the decoder and capable of receiving and adding the signals SNij given by the routing means when the decoder receives a phase $2i\pi/N$, the circuit giving, at one output, a signal SN.Ai that represents the multiplication of the signal by a waveform which is an approximate value of the sine waveform K sine φ.

N is preferably greater than or equal to 12 and if the phase is encoded in binary mode on p bits, N is equal to $2^p$.

At least some of the values Ai are obtained by a sum of several different powers of two.

K is preferably chosen to be low enough for the number of powers of two used in the adders to be equal to a maximum of a few units (for example 3 or 4), and for the number of additions performed for a specific phase to be limited if possible to two and exceptionally to three.

Preferably, K is equal to 13 or 8, when the phase is encoded on 4 bits and comprises $N=2^4$ samples in one period. The sums Ai resulting therefrom shall be seen further below. K is preferably equal to 7 when the phase takes 12 values on one period. In one borderline case, also taking 12 samples per period, K may be equal to 3 and, in this case, as shall be seen, the sine waveform is in fact approximated by a triangular waveform.

It will be understood that, by extension, the invention may be applied to the multiplication of a digital signal by a non-sine periodic waveform F(φ). Instead of seeking an approximation of the sine form K sine φ by simple algebraic sums of powers of two, a search will be made for the values of K enabling the approximation of a function K.F(φ) by simple algebraic sums of powers of two. Here too, the operation will start with a phase φ with a periodic sawtoothed form produced by a digital generator, with N phase samples φi per period.

The invention is especially valuable when the number N of values of different phases in a period is higher and when the digital signal SN is encoded on several bits.

BRIEF DESCRIPTION OF THE DRAWINGS

Other features and advantages of the invention shall appear from the following detailed description, made with reference to the appended drawings, of which.

MORE DETAILED DESCRIPTION

Figure 1:
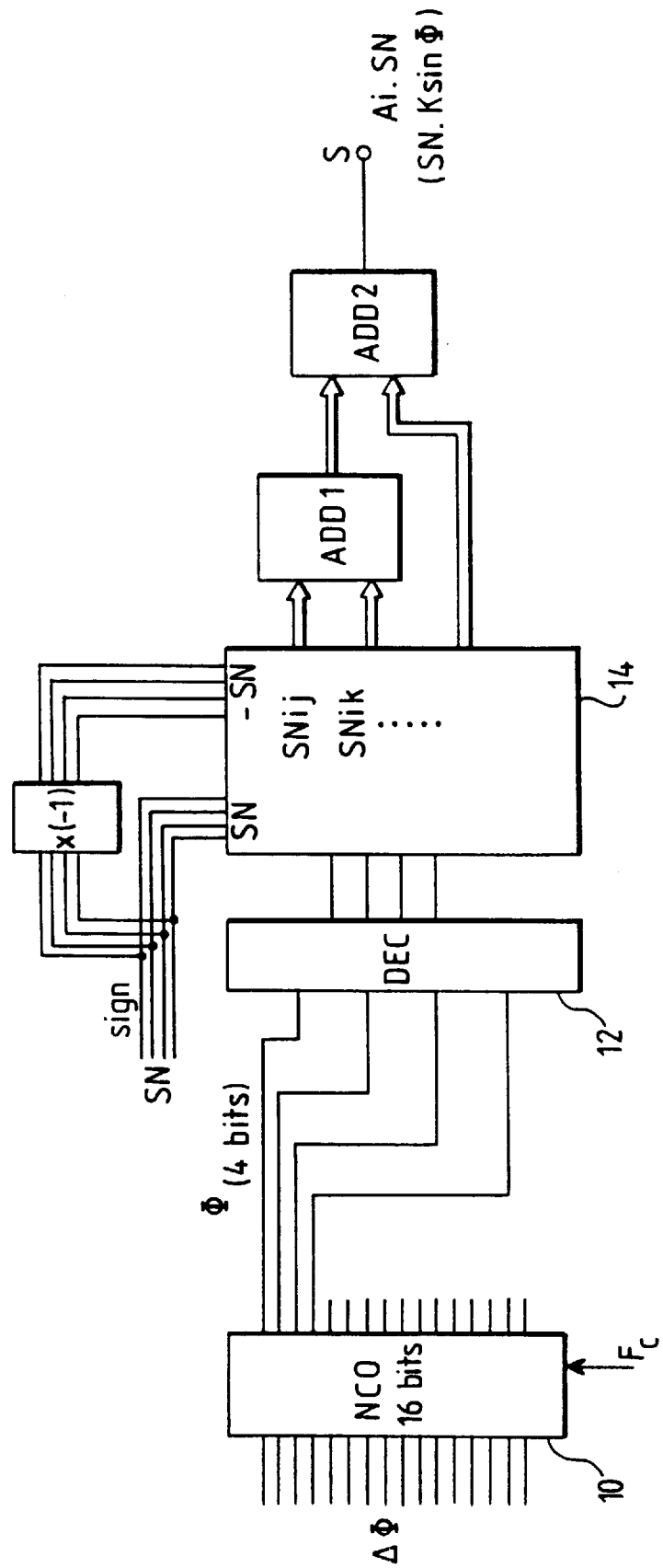
FIG. 1 shows the principle of the multiplication circuit according to the invention.

The reasoning behind the principle leading to the arrangements proposed by the present invention shall first of all be illustrated by a precise example.

The invention starts with a digital phase generator delivering a phase φ varying periodically in a linear sawtoothed form, and it is sought to obtain the product of a digital signal SN by a sine waveform with a phase φ.

The example is based on the case of a phase encoded on p=4 bits; $N=2^4=16$, i.e. the sine wave is defined by 16 points spaced out by π/8. The phase therefore successively takes values $\phi=2i\pi/8$, i being an index varying from 1 to N−1.

The invention is based on the following observation: it is possible to write tables which, for each phase value φ, namely for each index i, reveal an approximate value Ai of a value K sine φ such that this value Ai can be written in the form of a simple algebraic sum of powers of two. The number K is identical for the entire table. It represents in a way the amplitude of the sine wave used in the multiplication.

If, for example, K=8 is chosen, the following table can be written for the phases 0 to π/2 (the values for the other phases are deduced therefrom by standard trigonometric relationships, in particular by reversing the sign for the phases from π to 2π):

TABLE 1

| i | Φ | KsineΦ | approximation | sum Ai | error |
|---|---|---|---|---|---|
| 0 | 0 | 0 | 0 | 0 | 0 |
| 1 | π/8 | 3.061 | 3 | $2^1 + 2^0$ | +2% |
| 2 | π/4 | 5.657 | 6 | $2^2 + 2^1$ | −6% |
| 3 | 3π/8 | 7.391 | 7 | $2^3 − 2^0$ | +5.3% |
| 4 | π/2 | 8 | 8 | $2^3$ | 0 |

It is then observed that rather than multiplying the signal SN by a value sine φ computed on the basis of φ, it would be more worthwhile to multiply SN by the sine wave K sine φ, using the values Ai as approximate values. For it is then enough:

to know how to multiply the value SN by the numbers $2^1$, $2^2$ and $2^3$, and to know how to carry out an algebraic addition of the sums thus multiplied, either with one another or with the signal SN or the signal—SN.

These operations may be carried out in a very simple logic circuit comprising only a decoder controlled by the digital phase φ, several routing circuits and one adder. The routing circuits and the adder are controlled by the decoder as a function of the phase at a given instant.

A composite signal is then obtained at the output of the circuit. This composite signal represents an approximate value of the product SN.K sine φ which is an approximate value of the product of the signal SN by a sine waveform, the factor K representing an amplitude of this waveform.

The errors mentioned in the last column of Table 1 are given by way of an indication to show the precision to be expected. It will be noted that in any case the sole fact of digitizing a sine wave on a limited number of samples (16 samples per period for example) introduces an error far greater than that resulting from the above approximation. This shows that this approximation can be used without difficulty.

It is easy to find other values of K that are appropriate. However, the greater the increase in K, the greater is the risk that the number of cascade-connected adders will be high. This complicates the circuit and retards it.

One example that provides for an efficient compromise between a wave very close to a sinusoidal shape and a limited number of addition stages uses a value K=13. The case to which this example applies is still that of a phase encoding on 4 bits with $N=2^4$ samples. The table of approximation by a sum of powers of two is as follows:

TABLE 2

| i | Φ | KsineΦ | approximation | sum Ai | error |
|---|---|---|---|---|---|
| 0 | 0 | 0 | 0 | 0 | 0 |
| 1 | π/8 | 4.975 | 5 | $2^2 + 2^0$ | −0.5% |
| 2 | π/4 | 9.192 | 9 | $2^3 + 2^0$ | +2.2% |
| 3 | 3π/8 | 12.01 | 12 | $2^3 + 2^2$ | +0.1% |
| 4 | π/2 | 13 | 13 | $2^3 + 2^2 + 2^0$ | 0 |

In the above examples, the phase is encoded with 4 bits. It is possible to find values of K that enable approximations by sums of powers of two when the phase is encoded on a greater or smaller number of bits, and also if the phase is encoded on a number of samples that is not a power of 2.

For example, if the phase takes N=12 values per period, the phase digital generator delivers phases with a code that represents increments of π/6 and the decoder that controls routing circuits and adders is designed to decode the signals transmitted by the generator. In this case, in taking K to be roughly equal to 3, a triangular approximation of the sine wave 3 sine φ is obtained. The error may be 15%. However, if K is equal to 7, again with a phase encoded on 12 values, the approximation of the sums Ai may be as follows:

TABLE 3

| i | Φ | KsineΦ | Ai | breakdown |
|---|---|---|---|---|
| 0 | 0 | 0 | 0 | 0 |
| 1 | π/6 | 3.5 | 3 or 4 | $2^1 + 2^0$ or $2^2$ |
| 2 | π/6 | 6.08 | 6 | $2^2 + 2^1$ |
| 3 | π/2 | 7 | 7 | $2^3 - 2^0$ |

There is only one stage of adders to be implemented whatever the value of the phase.

The implementation of each of the examples referred to here above or yet other cases is very simple.

FIG. 1 gives a schematic view of the organization of the corresponding circuit.

The signal to be multiplied by a sine waveform with a phase φ is the signal SN encoded for example on 4 bits, including one sign bit.

The digital phase is given by a phase digital generator or numerically controlled oscillator (NCO) designated by the reference 10. The phase φ used is encoded on 4 bits. We shall return here below to the constitution of this generator in applications such as digital frequency changing in a GPS receiver.

For the present, it can be said simply that the principle of such an oscillator is as follows: it has a memory register, an input to which a phase increment value Δφ is added in digital form, an adder and a clock at fixed frequency Fc. At each clock stroke, the increment is added to the contents of the register, and the results are put in the memory. When the contents of the memory reach a value corresponding to 2π radians, the register is reset at zero. The register therefore contains an instantaneous phase value, oscillating linearly (and not sinusoidally) between 0 and 2π. The output of the generator represents the contents of the register, developing in a periodic sawtoothed form.

The resolution of the generator may be high, i.e. the output signal is given on 16 bits for example, or more. However, in most cases, the phase φ used for the multiplication of the signal SN may be encoded on a smaller number of bits, 4 in this example. In this case, the operation is limited to taking the four most significant bits at the output of the generator and the signal SN will be multiplied by the sine waveform sampled on 16 instants per period.

The circuit of FIG. 1 essentially comprises a decoder 12 that receives the four phase φ bits and activates a routing circuit 14. The routing circuit receives the digital signal SN, herein encoded for example on 4 bits, which has to be multiplied by the sine waveform. It also receives, as the case may be, the opposite −SN of this signal, especially when the algebraic sums Ai comprises subtraction operations. The routing circuit, depending on the state of the decoder 12 for a given phase φi, gives one or more digital values SNij, SNik, . . . , each representing the product of SN by a positive integer power of two to which a sign is assigned.

The multiplication of SN or −SN by $2^j$ to obtain SNij may be done by simple routing operation. Indeed, it consists in taking the signal SN on four wires (representing the 3 value bits of SN having weighting values $2^0$, $2^1$, $2^2$ respectively and the sign bit of SN with a weighting value $2^3$), assigning weighting values $2^j$, $2^{j+1}$, $2^{j+2}$ to the three value bits, a weighting value $2^{j+3}$ to the sign bit and adding j wires at zero as weighting values $2^0$ to $2^{j-1}$.

The routing circuit has the role of carrying out these shifts of weighting values of the bits of SN and of adding the least significant bits at zero to set up the signals SNij and SNik needed for a phase sample i.

Adders ADD1, ADD2 enable the addition, in sets of two, of the signals SNij, SNik, . . . , according to the model of the sums Ai to obtain, at an output S, the sum SNij+SNik+. . . which is equal to the product SN.Ai, namely the desired approximation of SN.K. sine φ.

Figure 2:
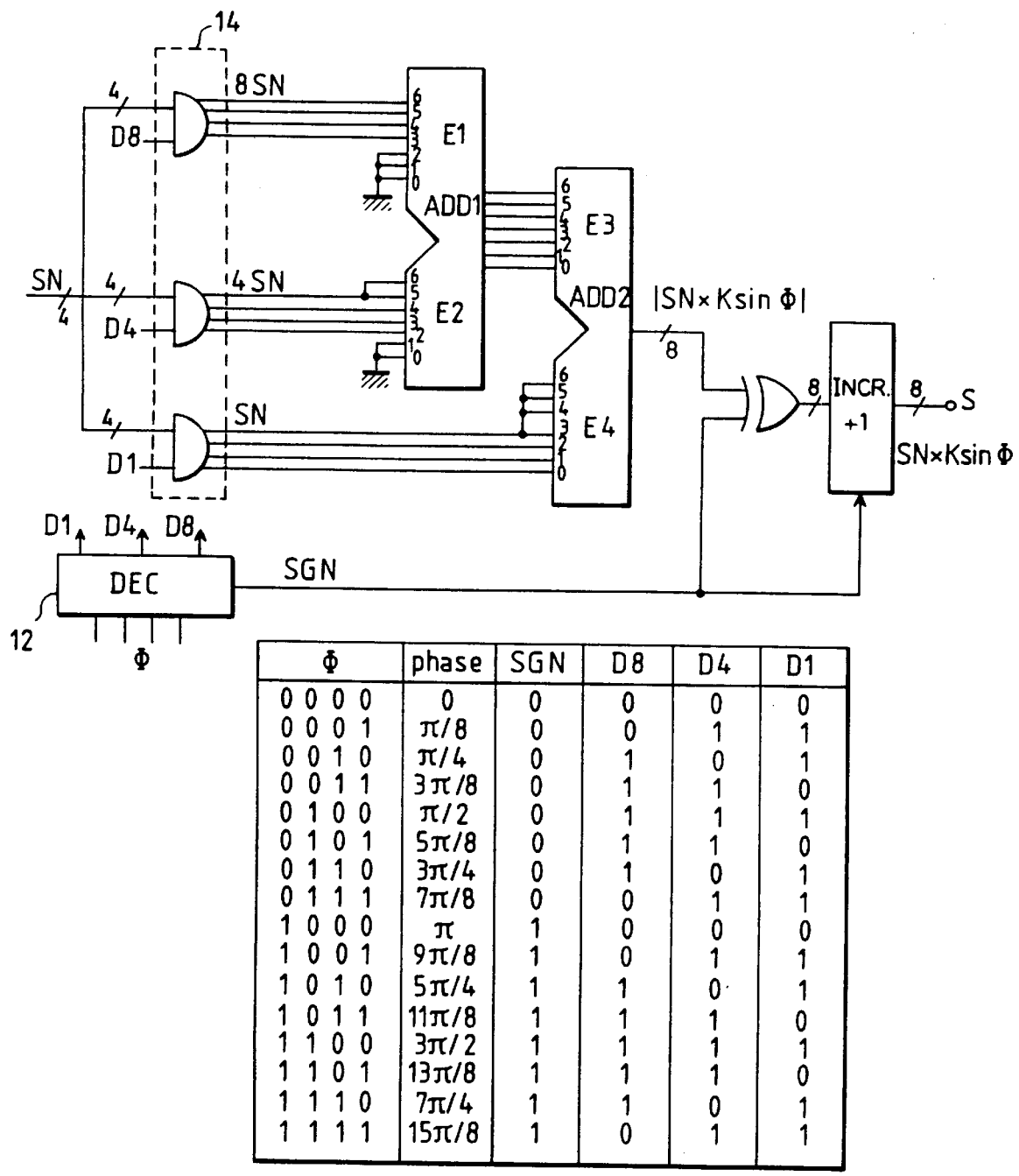
FIG. 2 shows a simple exemplary embodiment.

FIG. 2 shows a simple exemplary embodiment corresponding to the approximation defined in Table 2 (K=13).

According to Table 2, it is necessary to perform the following computations as a function of the phase sample i:

| | | |
|---|---|---|
| i = 0 | Φ = 0 | routing of a number 0 to the output of the circuit; |
| i = 1 | Φ = π/8 | routing of $SN.2^2$ and SN to the inputs of an adder; |
| i = 2 | Φ = π/4 | routing of $SN.2^3$ and SN to the inputs of an adder; |
| i = 3 | Φ = 3π/8 | routing of $SN.2^3$ and $SN.2^2$ to the inputs of an adder; |
| i = 4 | Φ = π/2 | routing of $SN.2^3$ and $SN.2^2$ to the inputs of a first adder then the output of the adder and SN to the inputs of a second adder; |
| i = 5 | Φ = 5π/8 | as in i = 3; |
| i = 6 | Φ = 3π/4 | as in i = 2; |
| i = 7 | Φ = 7π/8 | as in i = 1; |
| i = 8 | Φ = π | as in i = 0; |
| i = 9 up to i = 12 | | as in i = 1 to 1 = 4 respectively, but in taking the opposite of the result obtained or in using the opposite (−SN) of SN; |
| i = 13 | Φ = 13π/8 | as in i = 11; |
| i = 14 | Φ = 7π/4 | as in i = 10; |
| i = 15 | Φ = 15π/8 | as in i = 9. |

Two adders ADD1, ADD2 are necessary since, for the phases π/2 and −π/2, three terms are to be added.

The decoder 12 receives the four bits defining the phase φ. The phase generator is not represented. The decoder has four outputs, D1, D4, D8, respectively representing commands for the multiplication of SN by 1, by 4 and by 8, and the sign SGN to be assigned to these operations of multiplication as a function of the phase. The complete decoding table is shown in FIG. 2 and corresponds to the approximation defined in Table 2. The output D8 at 1 represents the need to perform a multiplication by 8; the output D4 at 1 shows the need for a multiplication by 4; the output D1 at 1 represents the need to use the non-multiplied signal SN, and finally the output SGN at 1 represents the need to reverse the sign of the result.

The routing circuit 14 simply has three groups of AND gates. Each group takes the form of a single gate comprising one input for the signal SN and one control input enabling the signal SN to be let through or not let through depending on the logic level applied to the control input.

A first gate is activated by the signal D8 and, if D8 is at 1, applies the signal SN to a first input E1 of a first adder ADD1 but does so in shifting the weighting values of the digits of SN by three bits in order to carry out the multiplication by 8: the weighting values of the digits of SN are applied to the inputs with weighting values 3 to 6 of the adder, the inputs with weighting values 0 to 2 being set at zero. If D8 is at zero, the input E1 receives 0. Thus, it can be assumed that this first gate gives either 0 (for the phase samples 0, 1, 7, 8, 9, 15) or a value of 8 SN (for the samples 2, 3, 4, 5, 6, 10, 11, 12, 13, 14).

A second gate is controlled by D4 and, if D4 is at 1, applies the signal SN to the weighting values 2 to 5 (multiplication by 4) of the second input E2 of the adder ADD1. The inputs with weighting values 0 and 1 are set at zero. The input with a weighting value 6 receives the sign bit of the signal SN (the sign bit also received at the input with a the weighting value 5). The input E2 receives 0 if D4 is at 0.

The adder ADD1 therefore gives either SN×4 if D4 is at 1 and D8 at 0 or SN×8 if D8 is at 1 and D4 at zero, giving 8×SN+4×SN, hence 12×SN if D4 and D8 are at 1, or finally 0 if D4 and D8 are at zero.

The output of the adder A1 is transmitted to the first input E3 of a second adder ADD2.

A third gate is controlled by the signal D1 and gives SN if D1 is at 1 or zero if D1 is at 0. The output of this gate is received by the second input E4 of the adder ADD2, the weighting value of the number SN corresponding to the weighting values 0 to 3 of this input. This corresponds to an absence of multiplication of SN. The sign bit (weighting value 3) of SN is copied at the inputs with weighting value 4 to 6.

The output of the adder ADD2 gives 0 or SN or 5×SN or 9×2N or 12×SN or 13×SN as a function of the decoding table.

The sign bit SGN of the decoder 12 (sign 0 for the phases 0 to 7⅞, sign 1 for the others) is applied to a sign changing circuit that receives the output of the adder ADD2. This sign changing circuit includes, in a one's complement logic, an exclusive-OR gate followed by an incrementer that adds a least significant unit to the output value of the exclusive-OR gate. The output S of the incrementer gives the approximation of SN.K sine φ in this case on 8 bits with one sign bit.

Figure 3:
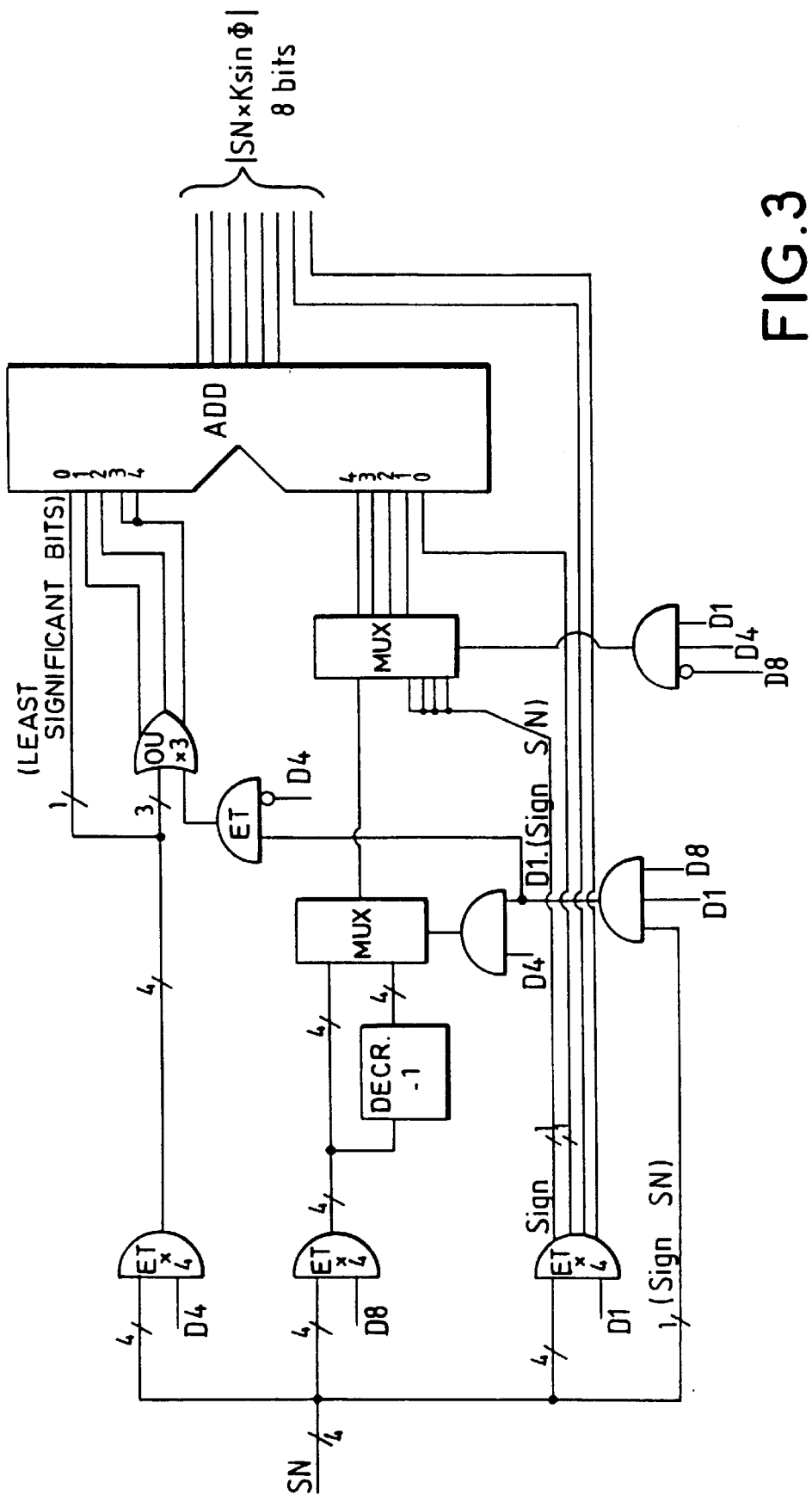
FIG. 3 shows an alternative embodiment of a part of FIG. 2.

This simple embodiment comprises three routing gates, two adders and the sign-changing circuit. It is possible to carry out the same routing and adding function with only one adder and additional gates to obtain a faster and more compact circuit. FIG. 3 shows an exemplary embodiment with only one adder, with two times 5 inputs and not two times 7 as in FIG. 2, enabling the precise performance of the same functions as the AND gates and the two adders of FIG. 2 using outputs D1, D4, D8 of the decoder 12.

The example of FIG. 3 is given only to show that it is possible to devise very different ways of performing the same function.

In certain applications, of which the receiver of satellite signals is an example, the phase φ is not taken directly at the high-order outputs of the digital phase generator. However, the complete output of the generator is added to a pseudo-random noise to obtain a deliberately noise-ridden phase, with a noise level lower than the least significant bit which will be used in the multiplication of the signal SN. The introduction of this noise is designed to eliminate periodic parasitic lines in the spectrum of the signal SN. sine φ. These lines are due to the truncation of the phase on 4 bits in the diagram of FIG. 1. In the case of a satellite signal receiver, these lines create the risk of loss of servo-control of the signal received and of retuning to neighboring frequencies.

Thus, typically, if the generator gives one phase on 16 bits, a 12-bit pseudo-random noise is added to it to obtain a noise-ridden phase that will be truncated in using only the four most significant bits. The spectrum of the signal K sine φ at output of the multiplier no longer has the troublesome parasitic lines.

Figure 4:
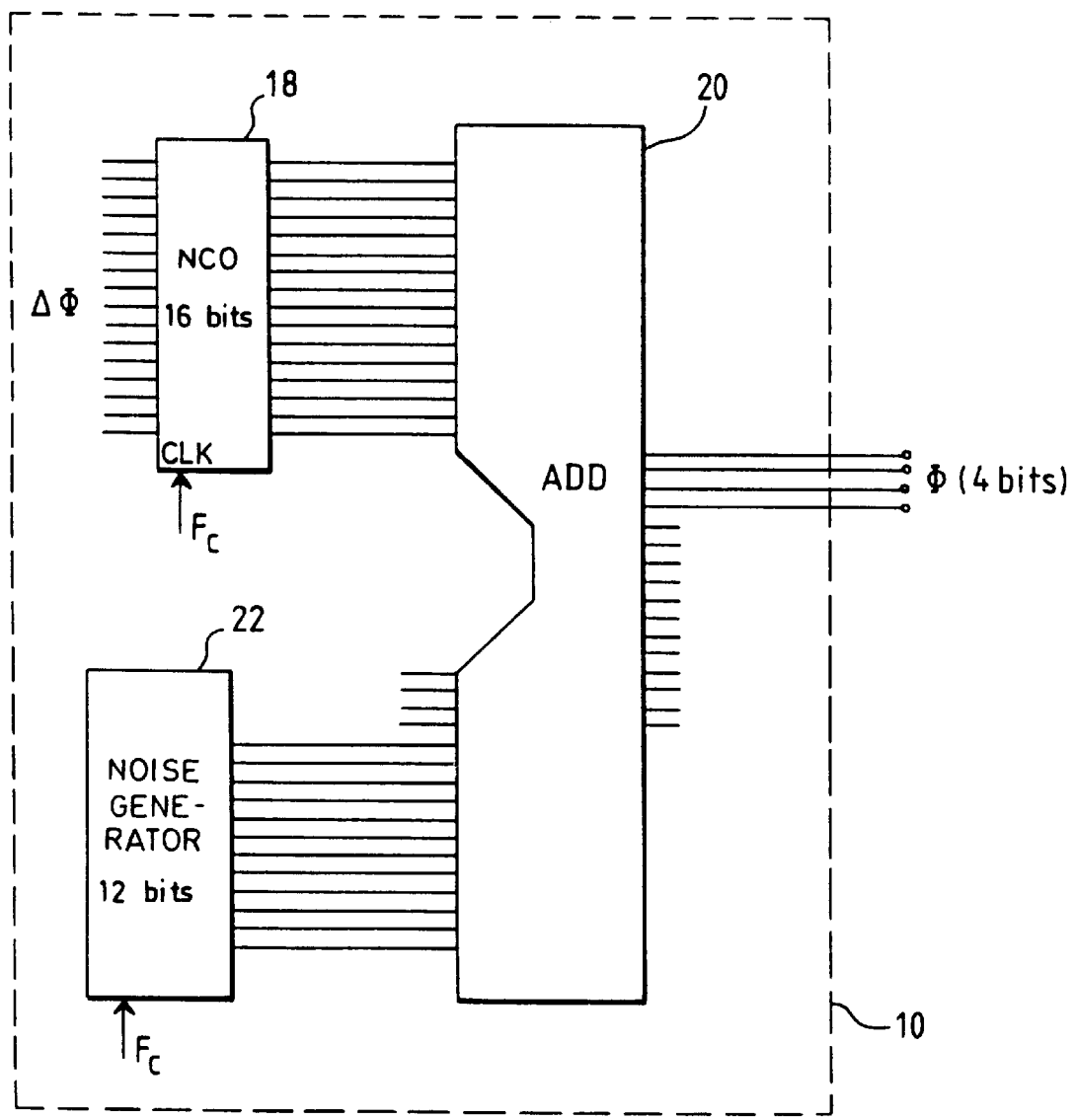
FIG. 4 shows the sawtoothed phase generator in a particular application.

The generator 10 of FIG. 1 is then constituted as shown in FIG. 4. The controlled oscillator NCO 18 has a clock input at a frequency Fc and a frequency and phase digital control input. This input defines the phase increment added to the outputs at each clock stroke. The 16 output bits of the oscillator NCO are added up, in an adder 20, to the 12 noise bits coming from the pseudo-random sequence generator. The 12 noise bits are applied with corresponding weighting values to the 12 low-order bits of the adder. The noise generator is, for example, a generator producing pseudo-random sequences with a length of $2^{20}$ bits.

The output of the adder is truncated on the four high-order bits to give the phase φ.

Figure 5:
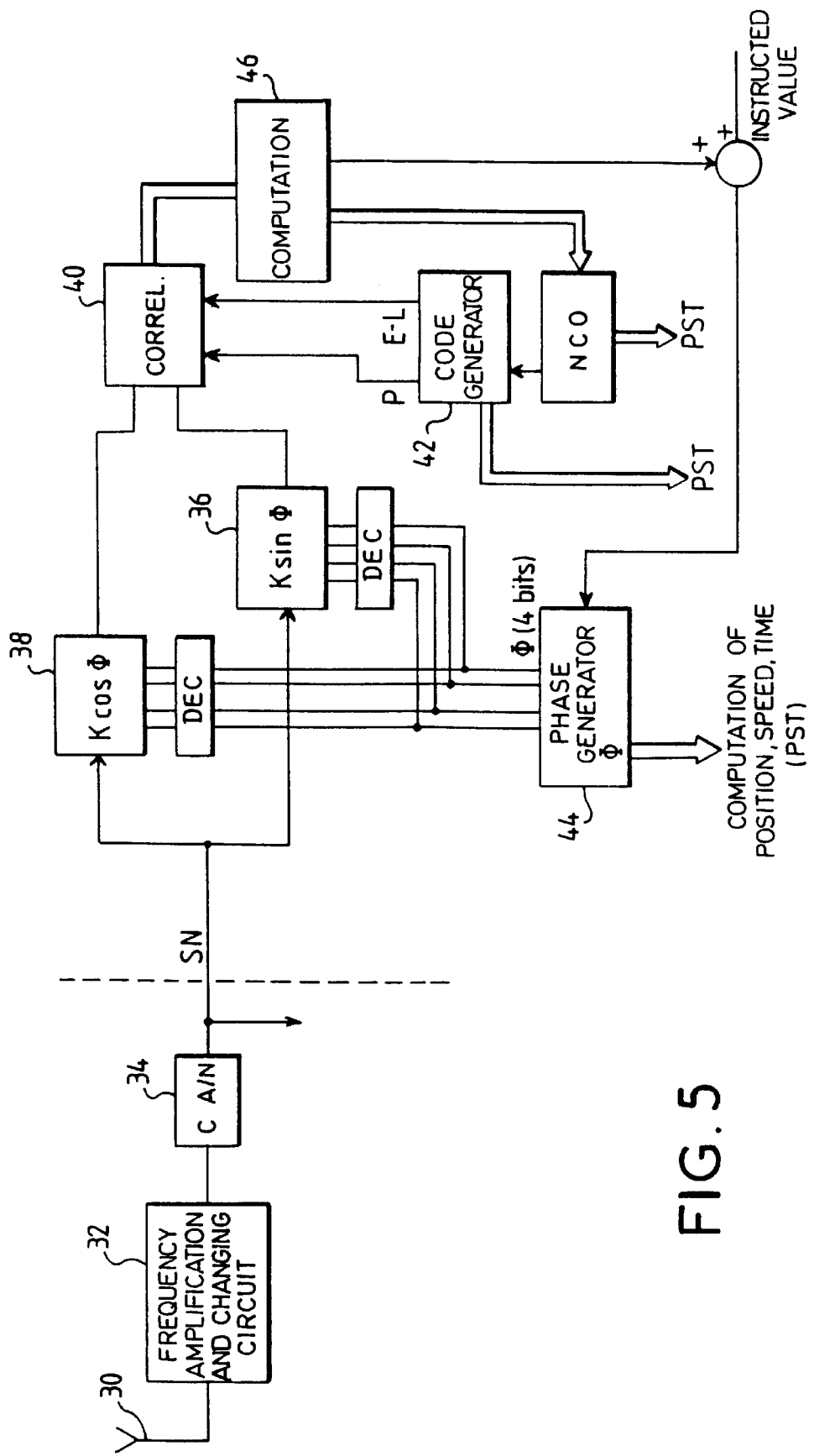
FIG. 5 shows an application of the multiplier in a phase digital servo-control loop of a satellite signal receiver.

FIG. 5 shows an application of the multiplier in a frequency and phase servo-control loop within a GPS or GLONASS satellite signal receiver.

The receiver has an antenna 30 for the reception of radiofrequency signals followed by frequency amplification and transpositions circuits 32 and then an analog-digital converter 34. The output signal from the converter is a digital signal representing samples of a carrier (at a transposed frequency, for example 20 MHz), phase-modulated by a pseudo-random code whose transition frequency is 1.023 MHz and whose duration is 1 millisecond.

The digitized signal is applied to a digital signal processing assembly that generally comprises several identical parallel channels for the reception of signals from several satellites simultaneously. Only one channel is shown in FIG. 5.

The digitized signal SN undergoes a digital frequency transposition for the extraction, from the carrier, of the modulation component. This transposition is achieved by the multiplication of the digitized signal SN by a sine wave with a frequency equal to the transposed carrier frequency.

This multiplication is done in accordance with the explanations given here above, namely by the production of a phase φ and the multiplication of the signal SN by sums Ai of powers of two approaching the value of K sine φ.

In general it is desired to have one channel "in phase" and one channel << in phase quadrature >>, and for this purpose the signal SN is multiplied not only by K sine φ (multiplier 36) but also by K cos φ (multiplier 38). It will be understood that the making of the circuit for multiplication by K cos φ is deduced immediately from the circuit for multiplication by K sine φ.

The sine and cosine channels which comprise the original phase modulation but at a frequency transposed by the multiplication are applied to a correlator 40 whose function is to indicate the degree of synchronization between the pseudo-random code contained in the sine and cosine channels and the pseudo-random code generated locally by a local code generator 42. The local code produced by the generator is identical to the code expected from the satellite.

The frequency of the sine wave is a frequency corresponding theoretically to the value of the transposed carrier frequency of the digital signal SN. The phase φ of this wave is produced by a generator 44 which may be built in accordance with FIG. 4. This generator is servo-controlled to keep a frequency and a phase corresponding to those of the transposed carrier received from the satellite. This enables the signal applied to the correlator to take account of any frequency shift due, for example, to a Doppler effect between the frequency theoretically received from the satellite and the frequency actually received.

The control phase generator 44 therefore receives a control signal which is the sum of a signal corresponding to an instructed value of frequency and a phase error and carrier frequency signal produced by computation (computation circuit 46) using signals given by the correlator 40.

At the same time, the local pseudo-random code generator 42 is driven by an oscillator whose frequency and phase are numerically controlled as a function of the computations made from the output of the correlator 40 to servo-link the local code to the received code.

The servo-controlled signals produced by the computation circuit 46 as well as the state of the code generator 42 and the phase generator 44 are used as information to determine the position of the receiver.

Thus, a particular application of the circuit according to the invention has been described.

What is claimed is:

1. A method for the multiplication of a digital signal SN by a sine waveform using a digital phase φ varying periodically in a sawtoothed form, wherein said method comprises the operations consisting in:

applying this phase to the input of a decoder using, as a decoding function, a table of N approximate integer values Ai of N numbers K sine 2iπ/N, i being an index from 0 to N−1, and K being any number that is identical for all the indices i, the approximate integer values Ai being algebraic sums of one or more positive integer powers of 2 to which a sign is assigned, at least some of the values being sums of several different powers of two, multiplying the digital signal SN, for each index i corresponding to a phase 2iπ/N, by the various powers of 2 that form the number Ai, under the control of the decoder, and obtaining the algebraic sums of the signals thus multiplied to form a digital value that is the product of SN by the approximate value Ai.

2. A method according to claim 1, wherein the multiplication by the powers of two is done by a routing circuit controlled by the decoder.

3. A method according to claim 1, wherein the decoding function uses the following values Ai, i being an index from 0 to 15: A0=0; A1=4+1; A2=8+1; A3=8+4; A4=8+4+1, the values A5 to A8 being the same as A4 to A0 respectively, and the values A9 to A15 being the opposite of the values A1 to A7 respectively.

4. A method according to claim 1, wherein the decoding function uses the following values Ai, i being an index from 0 to 15: A0=0; A1=2+1; A2=4+2; A3=8−1; A4=8, the values A5 to A8 being the same as A4 to A0 respectively, and the values A9 to A15 being the opposite of the values A1 to A7 respectively.

5. A method according to claim 1, wherein the decoding function uses the following values Ai, i being an index varying from 0 to 12: A0=0; A1=3 or 4; A2=6; A3=7, the values A4 to A6 being the same as A2 to A0 respectively, and the values A7 to A11 being the opposite of the values A1 to A5 respectively.

6. A method for the multiplication of a digital signal SN by a periodic waveform F(φ), using a digital phase φ varying periodically in a sawtoothed form and taking successive values φi during a period, i being an index from 0 to N−1, where N represents the number of phase samples used during one period, wherein said method comprises the operations consisting in:

applying this phase to the input of a decoder using, as a decoding function, a table of N approximate integer values Ai of N numbers KF(φi), K being any number that is identical for all the indices i, the approximate integer values Ai being algebraic sums of one or more positive integer powers of 2 to which a sign is assigned, at least certain values Ai being sums of several different powers of two, multiplying the digital signal SN, for each index i corresponding to a phase φi, by the various powers of 2 that form the number Ai, under the control of the decoder, obtaining the algebraic sums of the signals thus multiplied to form a digital value that is the product of SN by the approximate value Ai.

7. A digital multiplication circuit for the periodic multiplication of a digital value SN by a sine waveform, wherein said circuit comprises:

a means to produce a periodic digital phase φ varying in sawtoothed form, a decoder receiving the phase φ and bringing about the correspondence, with any value 2iπ/N of the phase φ, where i is an index varying from 0 to N−1, of one or more positive integer powers of 2 to which a sign is assigned, the algebraic sum Ai of which is an approximate value of K sine 2iπ/N, K having the same value for all the values of Ai, routing means activated by the decoder when it receives a phase 2iπ/N to give one or more signals SNij from the signal SN, the signal SNij representing the signal SN multiplied by one of the powers of two that are assigned a sign and are used in the sum Ai, means of addition activated by the decoder and capable of receiving and adding the signals SNij given by the routing means when the decoder receives a phase 2iπ/N, the circuit giving, at one output, a signal SN.Ai that represents the multiplication of the signal by a waveform which is an approximate value of the sine waveform K sine φ.

8. A circuit according to claim 7, wherein the routing means provide, under the control of the decoder, the products of SN by the powers of two corresponding to the following sums Ai, i being an index from 0 to 15: A0=0; A1=4+1; A2=8+1; A3=8+4; A4=8+4+1, the values A5 to A8 being the same as A4 to A0 respectively, and the values A9 to A15 being the opposite of the values A1 to A7 respectively.

9. A circuit according to claim 8, comprising a first adder to obtain the sums A0 to A3, A5 to A11, A13 to A15, and a part of each of the sums A4 and A12 and a second adder to obtain the rest of the sum A4 and of the sum A12.

10. A circuit according to claim 7, wherein the routing means provide, under the control of the decoder, the products of SN by the powers of two corresponding to the following sums Ai, i being an index from 0 to 15: A0=0;

A1=2+1; A2=4+2; A3=8−1; A4=8, the values A5 to A8 being the same as A4 to A0 respectively, and the values A9 to A15 being the opposite of the values A1 to A7 respectively, and the addition means comprising a single adder.

11. A circuit according to claim 7, wherein the routing means provide, under the control of the decoder, the products of SN by the powers of two corresponding to the following sums Ai, i being an index from 0 to 15: A0=0; A1=3 or 4; A2=6; A3=7; the values A4 to A6 being the same as A2 to A0 respectively, and the values A7 to A11 being the opposite of the values A1 to A5 respectively, and the addition means comprising a single adder.

12. A digital multiplication circuit for the periodic multiplication of a digital signal SN by a periodic waveform $F(\phi)$, using a digital phase $\phi$ varying periodically in a sawtoothed form and taking successive values $\phi i$ during a period, i being an index from 0 to N−1, where N represents the number of phase samples used during one period, wherein said circuit comprises:

- a means to produce a periodic digital phase $\phi$ varying in sawtoothed form,
- a decoder receiving the phase $\phi$ and bringing about the correspondence, with any value $\phi i$ of the phase $\phi$, of the sum Ai of one or more positive integer powers of 2 to which a sign is assigned, i being an index varying from 0 to N−1, each number Ai being equal to an approximate value of $KF(\phi i)$, K having the same value for all instances of Ai, and at least certain values of Ai being constituted by sums of several different powers of two,
- routing means activated by the decoder when it receives a phase $\phi i$ to give one or more signals SNij from the signal SN, the signal SNij being the signal SN multiplied by one of the powers of two that are assigned a sign and are used in the sum Ai,
- means of addition activated by the decoder and capable of receiving and adding the signals SNij given by the routing means when the decoder receives a phase $\phi i$,
- the circuit giving, at one output, a signal SN.Ai that represents the multiplication of the signal by a waveform which is an approximate value of the periodic waveform $K(\phi)$.

13. An application of the multiplication circuit according to one of the claims 7 to 11, to a receiver of satellite positioning signals, wherein the receiver has a digital servo-control loop receiving a signal SN received from a satellite, frequency transposed and then digitized, the loop producing a phase error signal applied to a digital phase generator, the generator producing said digital periodic phase $\phi$ varying in a linear sawtoothed form, the output of the multiplication circuit constituting a digital signal frequency transposed digitally by the multiplication of the signal SN by a sine waveform; and means of correlation and computation being provided in the servo-control loop to produce the error signal from the signal thus multiplied.

14. An application of the multiplication circuit according to claim 13 wherein the digital phase generator comprises a phase numerically controlled oscillator, a means to add a pseudo-random noise to the output of the oscillator and a means to truncate the phase resulting from this addition and to apply it to the decoder.

* * * * *